(12) United States Patent
Eliáš et al.

(10) Patent No.: US 9,348,585 B2
(45) Date of Patent: May 24, 2016

(54) SYSTEM AND METHOD FOR ESTIMATING IMPACT OF SOFTWARE UPDATES

(71) Applicant: Red Hat, Inc., Raleigh, NC (US)

(72) Inventors: Filip Eliáš, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/971,752

(22) Filed: Aug. 20, 2013

(65) Prior Publication Data

US 2015/0058822 A1     Feb. 26, 2015

(51) Int. Cl.
   *G06F 9/44*     (2006.01)

(52) U.S. Cl.
   CPC ... *G06F 8/75* (2013.01); *G06F 8/71* (2013.01)

(58) Field of Classification Search
   None
   See application file for complete search history.

(56) References Cited

U.S. PATENT DOCUMENTS

| | | | |
|---|---|---|---|
| 7,111,290 B1 * | 9/2006 | Yates et al. | 717/158 |
| 7,191,435 B2 * | 3/2007 | Lau et al. | 717/168 |
| 7,366,824 B2 * | 4/2008 | Chiang | 717/168 |
| 7,614,046 B2 | 11/2009 | Daniels | |
| 7,895,592 B2 * | 2/2011 | Subramanian et al. | 717/168 |
| 7,958,400 B2 * | 6/2011 | Ur | 717/126 |
| 8,219,983 B1 | 7/2012 | Sobel et al. | |
| 8,261,353 B2 | 9/2012 | Hirsave et al. | |
| 8,495,583 B2 * | 7/2013 | Bassin et al. | 717/127 |
| 8,656,368 B1 * | 2/2014 | Ovadia et al. | 717/130 |
| 8,745,611 B2 * | 6/2014 | Saraf et al. | 717/170 |
| 8,863,108 B2 * | 10/2014 | Das | 717/168 |
| 2006/0117310 A1 * | 6/2006 | Daniels et al. | 717/168 |
| 2006/0218535 A1 * | 9/2006 | Delmonte et al. | 717/127 |
| 2009/0089119 A1 | 4/2009 | Ranjan | |
| 2010/0058313 A1 * | 3/2010 | Hansmann et al. | 717/168 |
| 2010/0114962 A1 * | 5/2010 | Ahadian | G06F 8/75 707/782 |

(Continued)

FOREIGN PATENT DOCUMENTS

EP     1998253 A1 *  12/2008

OTHER PUBLICATIONS

Ant. "Difference between Binary release and source release?" Stack Overflow. N.p., Mar. 12, 2011. Web. Oct. 27, 2014. <http://stackoverflow.com/questions/5280906/difference-between-binary-release-and-source-release>.*

(Continued)

*Primary Examiner* — Anil Luu
*Assistant Examiner* — Binh Luu
(74) *Attorney, Agent, or Firm* — Haynes & Boone LLP

(57) ABSTRACT

A system and method of estimating impact of software updates includes obtaining usage measures for an instance of a software application, analyzing the software update of the software application by comparing base code for the software application to updated code for the software application, identifying one or more lines of interest from the base code based on the comparing, and aggregating the usage measures for the instance associated with the lines of interest to determine an impact factor. The base code corresponds to source code for the instance. The updated code corresponds to source code for the software application after the software update is applied to the base code. In some examples, the system and method further include normalizing the impact factor based on a length of time used to collect the usage measures, a number of lines of code in the base code, and a number of lines of code in the updated code.

17 Claims, 5 Drawing Sheets

(56) References Cited

U.S. PATENT DOCUMENTS

| | | | |
|---|---|---|---|
| 2012/0131564 A1* | 5/2012 | Das | 717/168 |
| 2012/0192172 A1* | 7/2012 | Hansmann et al. | 717/168 |
| 2012/0222025 A1* | 8/2012 | Pandit | 717/170 |
| 2013/0042230 A1* | 2/2013 | Little et al. | 717/173 |
| 2013/0074051 A1* | 3/2013 | Freeman | 717/130 |
| 2014/0282406 A1* | 9/2014 | Narasimhan et al. | 717/124 |

OTHER PUBLICATIONS

"Profiling an Application." QNX Software Systems. N.p., Jun. 1, 2010. Web. Oct. 29, 2014. <http://web.archive.org/web/20100601022136/http://www.qnx.com/developers/docs/6.4.1/ide_en/user_guide/profiler.html>.*

Mitchell et al., "Run-Time Cohesion Metrics: An Empirical Investigation," National University of Ireland, Department of Computer Science, http://www.cs.may.ie/~jpower/Research/Papers/2004/mitchell-serp04.pdf , 2004, 6 pages.

Gui Gui et al., "New Coupling and Cohesion Metrics for Evaluation of Software Component Reusability," Univ. of Essex / The $9^{th}$ International Conference for Young Computer Scientists, ICYCS 2008, Nov. 18-21, 2008, 6 pages, http://ieeexplore.ieee.org/xpls/abs_all.jsp?arnumber=4709141.

Joshi et al., "Concept Analysis for Class Cohesion," Indian Inst. of Technol. Bombay / 13th European Conference on Software Maintenance and Reengineering, CSMR '09, Mar. 24-27, 2009, 4 pages, http://ieeexplore.ieee.org/xpl/login.jsp?tp=&arnumber=4812758&url=http%3A%2F%2Fieeexplore.ieee.org%2Fxpls%Fabs_all.jsp%3Farnumber%3D4812758.

Gupta, Varun et al., "Object Level Run-Time Cohesion Measurement," International Journal *Information Theories & Applications*, vol. 16, No. 2, 2009, 11 pages.

* cited by examiner

300

310 — Collect one or more usage measures

320 — Analyze a software update to determine lines of interest

330 — Compute an impact factor

| Class | Line n | Line n+1 | ... | Line m |
|---|---|---|---|---|
| com.ourco.class1 | 2 | 2 | ... | 0 |
| com.ourco.class2 | 8 | 6 | ... | Inf |
| ⋮ | ⋮ | ⋮ | ⋮ | ⋮ |

SYSTEM AND METHOD FOR ESTIMATING IMPACT OF SOFTWARE UPDATES

BACKGROUND

The present disclosure relates generally to computing systems, and more particularly to estimating impact of software updates.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In the modern computing environment, software is constantly being updated. Software updates can be made for many reasons, including the correcting of defects in the software, adding new features, changing existing features, and/or the like. Just as with any other change, a software update has both risks and rewards. The rewards include the purpose for the update such as the correction of defects and the changes to features. The risks may not be so obvious. Any time a change is made to software, it carries the risk that something that was previously working may no longer work the same way or may no longer work at all. One way to mitigate these risks is through extensive testing of the update before its release and deployment. Unfortunately, extensive testing is often time consuming and expensive and goes not guarantee a risk-free update. In some cases, the amount of testing to perform on an update before its release may be based on a perceived impact of the update on end users, however, this is often a subjective analysis that may vary from end user to end user.

Accordingly, it would be desirable to provide improved systems and methods for estimating the impact of a software update.

SUMMARY

According to one example, a method of estimating an impact of a software update includes obtaining usage measures for a first instance of a software application, analyzing the software update of the software application by comparing base code for the software application to updated code for the software application, identifying one or more lines of interest from the base code based on the comparing, and aggregating the usage measures for the first instance associated with the lines of interest to determine an impact factor. The base code corresponds to source code for the first instance. The updated code corresponds to source code for the software application after the software update is applied to the base code.

According to another example, a system for estimating an impact of a software update includes a first usage monitor that monitors execution of a first instance of a software application to determine usage measures for the first instance, base code for the software application corresponding to source code for the first instance, updated code for the software application corresponding to source code for the software application after the software update is applied to the base code, and an impact analyzer. The impact analyzer compares the base code to the updated code, identifies one or more lines of interest from the base code based on the comparison, and aggregates the usage measures for the first instance associated with the lines of interest to determine an impact factor.

According to yet another example, a non-transitory machine-readable medium comprising a first plurality of machine-readable instructions which when executed by one or more processors associated with one or more computing systems are adapted to cause the one or more processors to perform a method. The method includes retrieving first usage counts for a program running in a first deployment environment, retrieving second usage counts for the program running in a second deployment environment, determining one or more differences between source code for the program and updated source code for the program after a code update is applied to determine one or more deleted, changed, or added source code lines, and adding the first usage counts associated with the deleted, changed, or added source code lines and the second usage counts associated with the deleted, changed, or added source code lines to an impact factor.

BRIEF DESCRIPTION OF THE DRAWINGS

FIG. 3 is a simplified diagram of a method of estimating impact of a software update according to some examples.

FIG. 4 is a simplified diagram of a usage table that may be used to collect usage measures according to some examples.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
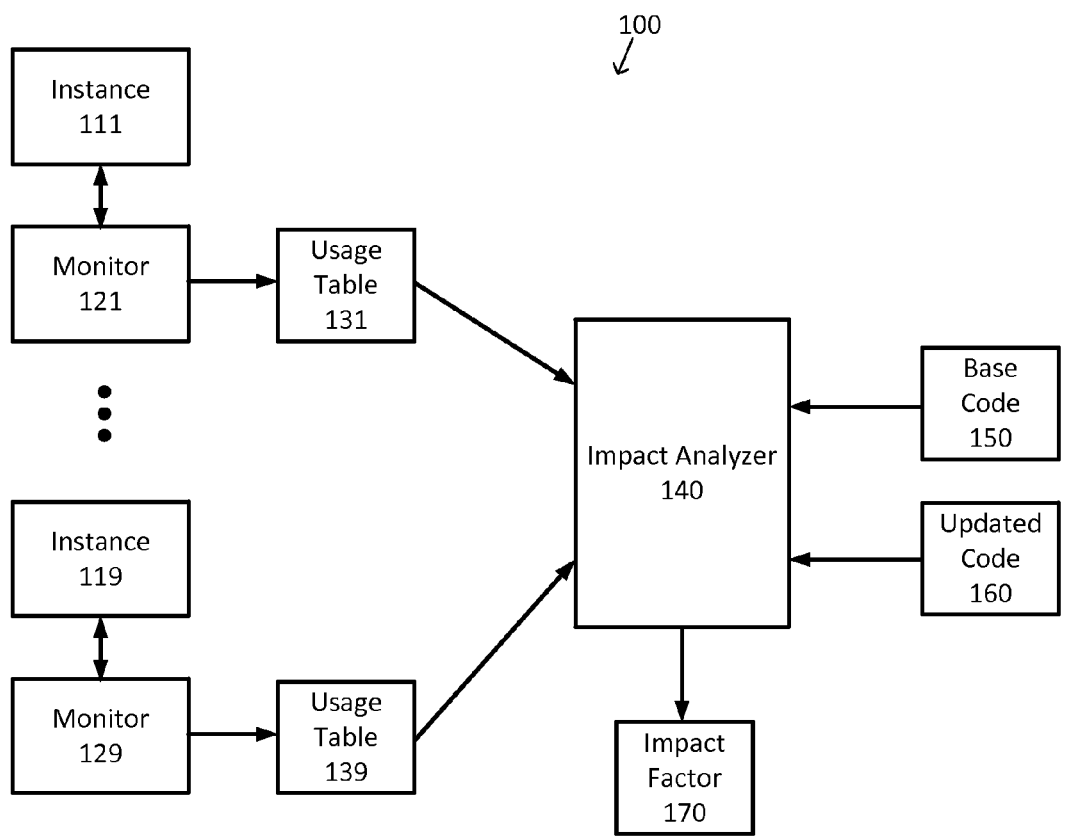
FIG. 1 is a simplified diagram of an impact estimation system for estimating the impact of a software update according to some examples.

FIG. 1 is a simplified diagram of an impact estimation system 100 for estimating the impact of a software update according to some examples. As shown in FIG. 1, impact estimation system 100 is based on a multi-part analysis.

First, usage measures and/or statistics are collected for a software application or program while it is running. The usage of an instance 111 of the software application is monitored by a usage monitor 121. Instance 111 may represent any instance of the software application, no matter where or how it is deployed. In some examples, instance 111 may be deployed by an end user in a production environment. In some examples, instance 111 may be deployed in a test environment. In some examples, instance 111 may be undergoing normal usage patterns and/or abnormal usage patterns. As instance 111 is executing, usage monitor 121 tracks the execution of instance 111 and records the usage in a usage table 131. Usage table 131 may be stored in any suitable data structure, database, storage system, and/or the like. In some examples, usage monitor 121 may track which lines of code in the software application are being executed and record, in usage table 131, a count of the number of times each line of code is executed.

Usage measures and/or statistics may be collected on other instances of the software application and/or for different periods of operation of the same instance of the software application. A representative example of this is shown in FIG. 1 where an instance 119 of the software application is being monitored by a usage monitor 129, which records the usage of instance 119 in a usage table 139. In some examples, instance 111 and 119 may be the same instance. In some examples, the usage recorded in usage table 139 may be different from the usage recorded in usage table 131 even though instances 111 and 119 are instances of the same software application. In some examples, this may occur when instance 111 and instance 119 are subjected to different usage patterns from different end users and/or different use cases.

The usage information collected in usage tables 131 and 139 is made available to an impact analyzer 140. Impact analyzer 140 correlates the usage information in usage tables 131 and 139 to updates made to the software application by the software update. In some examples, impact analyzer 140 may determine the updates made to the software application by the software update by comparing a copy of the source code for the software application that is used with instances 111 and 119 (i.e., a base code 150) with a copy of the source code after the software update is applied (i.e., an updated code 160). In some examples, differences between the base code 150 and the updated code 160 may be determined using any diff tool that is capable of identifying which lines of code have been deleted, changed, and added between the base code 150 and the updated code 160. In some examples, impact analyzer 140 may also determine which methods and/or functions in the software application include deleted, changed, and/or added lines of code and consider the usage information associated with any lines of code that call these updated methods and/or functions. In some examples, impact analyzer 140 may also determine which classes and/or data structures in the software application include deleted, changed, and/or added lines of code associated with non-executable code of the classes and/or data structures, and consider the usage information associated with any lines of code that reference these updated classes and/or data structures. In some examples, the base code 150 and/or the updated code 160 may be stored in one or more code repositories. In some examples, the one or more code repositories may support version control and/or diff tools.

By aggregating the usage information collected in the usage tables 131 and 139 that is associated with the deleted, changed, and added lines of code, impact analyzer 140 may determine an impact factor 170 that is based on those portions of the software application that are affected by the software update. Thus, instances of the software application that do not use or rarely use updated sections of the software application in which lines of code are deleted, changed, and/or added may result in a lower impact factor 170 relative to instances of the software application that use the updated sections more often. In some examples, impact analyzer 140 may also normalize impact factor 170 based on a length of time each of the instances 111 and/or 119 of the software application were monitored to generate the respective usage table 131 and/or 139. In some examples, impact analyzer 140 may also normalize impact factor 170 based on a number of lines of code in either the base code 150 or the updated code 160. In some examples, impact analyzer 140 may also normalize impact factor 170 based on a number of usage tables 131 and/or 139 used to generate impact factor 170.

Collecting usage from multiple instances of the same software application provides several advantages. In some examples, the usage patterns of different instances of the software application may provide a better overall assessment of how the software update may impact the software application. In some examples, a separate impact factor may be generated for each instance allowing impact estimation system 100 to evaluate the impact of the software update on different end users and/or customers. In some examples, an impact factor may be generated over all the instances as used by a particular customer, so that an overall impact to that customer may be evaluated. In some examples, the separate impact factors may support different deployment decisions for the software update based on the usage patterns of different end users. In some examples, the impact factors may be used to determine a level of testing that is appropriate for the software update prior to releasing it to one or more end users and/or customers.

Figure 2:
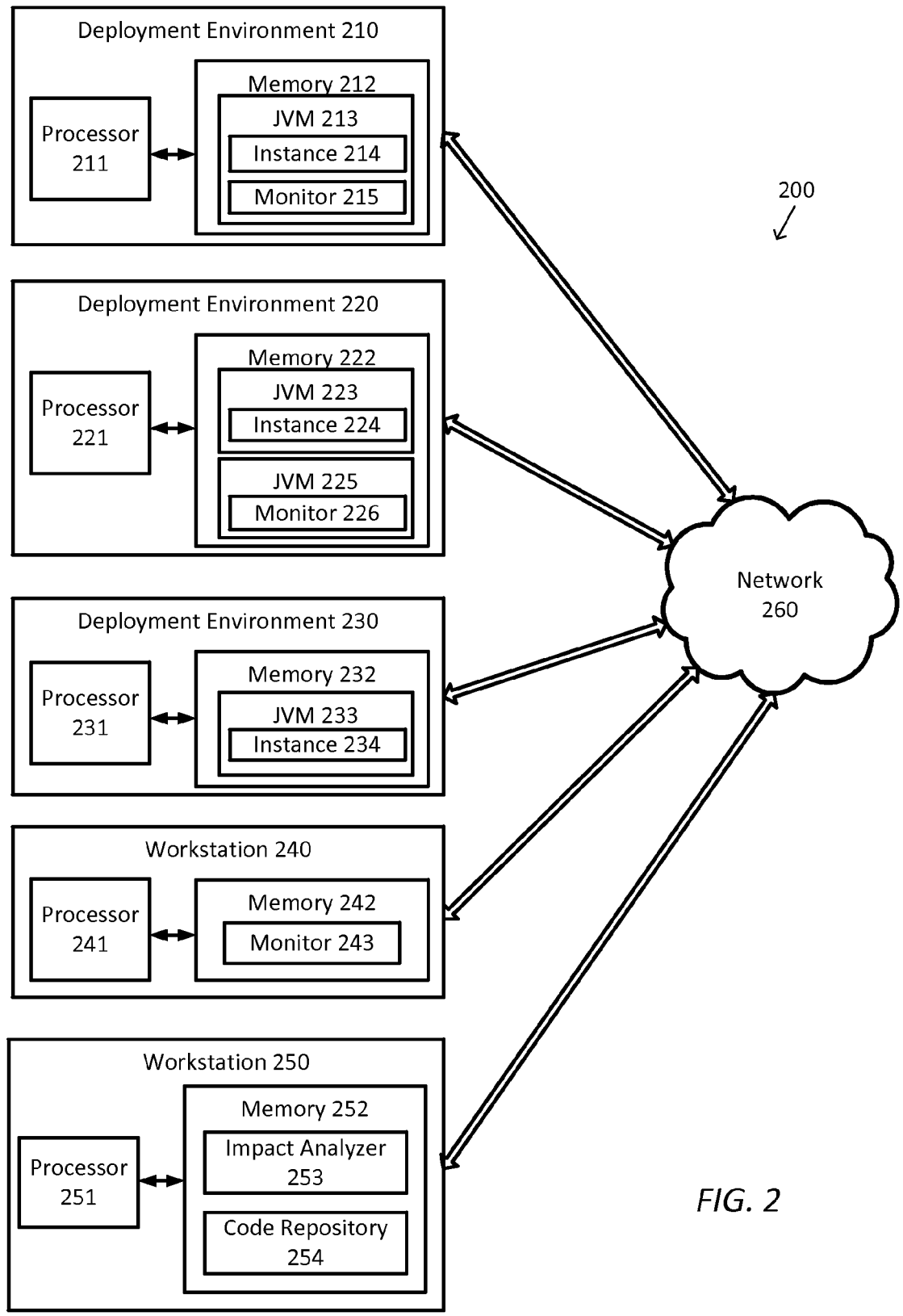
FIG. 2 is a simplified diagram of a computing system according to some examples.

FIG. 2 is a simplified diagram of a computing system 200 according to some examples. As shown in FIG. 2, computing system 200 includes a deployment platform 210. Deployment platform 210 is the target system on which a software application may be executed. In some examples, deployment platform 210 may be a standalone workstation, a cluster, a production server, within a virtual machine, and/or the like. Deployment platform 210 includes a processor 211 coupled to memory 212. In some examples, processor 211 may control operation and/or execution of instances of software applications on deployment platform 210. Although only one processor 211 is shown, deployment platform 210 may include multiple processors and/or multi-core processors.

Memory 212 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 212 may further be used to store a Java virtual machine (JVM) 213. JVM 213 is a virtual machine capable of executing complied Java software. JVM 213 includes an instance 214 of a software application. In some examples, instance 214 may be instance 111 or 119. JVM 213 further includes a usage monitor 215. In some examples, usage monitor 215 may be usage monitor 121 and/or usage monitor 129. Usage monitor 215 may be used to monitor the usage of instance 214 and generate a usage table (not shown). In some examples, the usage table may be stored in memory 212 and/or in some other persistent storage located in deployment environment 210. In some examples, the usage table may be stored in another server, workstation, deployment environment, storage system, and/or the like coupled to deployment environment 210. In some examples, the usage table may be usage table 131 and/or usage table 139.

Usage monitor 215 may monitor instance 213 using one of several approaches. In some examples, usage monitor 215 may be an extension to JVM 213 that monitors JVM 213 as it executes instance 214. Thus, as JVM 213 executes each line of code in instance 214, usage monitor 215 may observe and increment a count in the usage table for that corresponding line of code. In some examples, when usage monitor 215 is an extension to JVM 213, it may efficiently count the lines of code as they execute. In some examples, usage monitor 215 may be separate from JVM 213 and monitor debugging information provided by JVM 213. In some examples, JVM 213 may be configured to provide debugging information to a port, a socket, and/or other distributing mechanism. This debugging information may include information on the lines of code being executed. Usage monitor 215 may connect a corresponding port, socket, and/or other listening mechanism of JVM 213. In some examples, when usage monitor 215 listens to the provided debugging information, this may be less efficient than a JVM extension, but may provide better support for usage monitoring in a cluster and/or other distributed deployment environment. In some examples, code to be monitored using usage monitor 215 should be compiled with debugging information so that the line numbers are available at run time to usage monitor 215 either through the JVM extension or through the debugging information.

Computing system 200 further includes other representative deployment environments showing several examples of the possible configurations between instances of software applications and the usage monitors that monitor the usage of those instances. As an example, a deployment platform 220 includes a processor 221 coupled to memory 222. Processor 221 may be similar to processor 211 and memory 222 may be similar to memory 212. Memory 222 may be used to store multiple JVMs including a JVM 223 executing an instance 224 of the software application and a JVM 225 executing a usage monitor 226. Usage monitor 226 may be used to monitor the usage of instance 224 and create a corresponding usage table (not shown). In some examples, because instance 224 and usage monitor 226 are executing in separate JVMs, usage monitor 226 may be listening to the debugging information provided by JVM 223 as it executes instance 224.

As another example, a deployment platform 230 includes a processor 231 coupled to memory 232. Processor 231 may be similar to processor 211 and memory 232 may be similar to memory 212. Memory 232 may be used to store a JVM 233 executing an instance 234 of the software application. The usage monitor for instance 234 is located separate from deployment environment 230. A workstation 240 includes a processor 241 and memory 242. Processor 241 may be similar to processor 211 and memory 242 may be similar to memory 212. Although described as a workstation, workstation 240 may be any kind of workstation, server, deployment environment, and/or the like. Memory 242 may be used to store a usage monitor 243 that may be used to monitor the usage of instance 234 in the separate deployment environment 230 and create a corresponding usage table (not shown). In some examples, because instance 234 and usage monitor 243 are executing in separate environments, usage monitor 243 may be listening to the debugging information provided by JVM 233 as it executes instance 234.

Computing system 200 may further include a workstation 250. In some examples, workstation 250 may be a standalone workstation, a cluster, a production server, within a virtual machine, and/or the like. Workstation 250 includes a processor 251 coupled to memory 252. Processor 251 may be similar to processor 211 and memory 252 may be similar to memory 212. Memory 252 may be used to store an impact analyzer 253 and a code repository 254. In some examples, impact analyzer 253 may be impact analyzer 140. Each of the usage tables generated by usage monitors 215, 226, and/or 243 may be used by impact analyzer 253 to determine an impact factor similar to impact factor 170. In some examples, code repository 254 may be used to store versions of a base code and an updated code for the software application corresponding to instances 214, 224, and/or 234.

Deployment environments 210, 220, 230 and workstations 240 and 250 may be further coupled to each other using a network 260. In some examples, network 260 may be any kind of network, including a local area network (LAN) such as Ethernet, a wide-area network (WAN) such as an internet, and/or multiple networks. Network 260 may be used by impact analyzer 253 to access the usage tables created by usage monitors 215, 226, and/or 243. Network 260 may further be used by usage monitor 243 to listen to the debugging information provided by JVM 233 about the execution of instance 234.

As discussed above and further emphasized here, FIGS. 1 and 2 are merely examples which should not unduly limit the scope of the claims. One of ordinary skill in the art would recognize many variations, alternatives, and modifications. According to certain examples, relationships between the usage monitors and the instances may be different. In some examples, a shared usage monitor may be used to monitor the usage of more than one instance of the software application. In some examples, the shared usage monitor may store the usage of multiple instances in the same and/or a different usage table. In some examples, only a usage table for only one instance of the software application is collected. In some examples, usage tables for more than three instances of the software application are collected.

According to certain examples, the configuration of deployment environments, workstations, JVMs, and/or the like may be different than the examples of FIG. 2. In some examples, multiple instances of the software application may be hosted in the same JVM and/or the same virtual machine. In some examples, multiple usage monitors may be hosted in the same JVM and/or the same virtual machine. In some examples, the impact analyzer may be hosted in any of the deployment environments 210, 220, and/or 230, and/or in workstation 240. In some examples, code repository 254 may be hosted in any of the deployment environments 210, 220, and/or 230, in workstation 240, and/or in a separate server. In some examples, one or more additional code repositories may be used.

FIG. 3 is a simplified diagram of a method 300 of estimating impact of a software update according to some examples. In some examples, one or more of the processes 310-330 of method 300 may be implemented, at least in part, in the form of executable code stored on non-transient, tangible, machine readable media that when run by one or more processors (e.g., the processors 211, 221, 231, 241, and/or 251) may cause the one or more processors to perform one or more of the processes 310-330. In some examples, the method 300 may be performed using any combination of JVMs 213, 223, and/or 233, usage monitors 121, 129, 215, 226, and/or 243, and/or impact analyzers 140 and/or 253.

At a process 310, one or more usage measures are collected. While instances of a software application, such as instances 111, 119, 214, 224, and/or 234 are executing, they may be monitored to collect one or more measures of their usage. In some examples, one or more of the usage monitors 121, 129, 215, 226, and/or 243 may count a number of times each line of code in the instances is executed and record them in one or more corresponding usage tables, such as usage tables 131 and/or 139. In some examples, the usage monitors 121, 129, 215, 226, and/or 243 may operate as an extension to a JVM and/or monitor debugging information provided by a JVM.

FIG. 4 is a simplified diagram of a usage table 400 that may be used to collect usage measures according to some examples. As shown in FIG. 4, usage table 400 may be used when collecting usage measures for a software application written in an object-oriented language such as Java, C++, C#, and/or the like. Usage table 400 organizes line of code counts by a class 410 and line numbers 420. Each class 410 may be identified by a class name as shown by the two representative samples of com.ourco.class1 and com.ourco.class2. Lines of code within the class are identified by a line number as shown by the representative line numbers n, n+1, and m. As each line of code in the corresponding class is executed, the count recorded in usage table 400 may be incremented. As shown in usage table 400, line n of the class com.ourco.class1 has been counted 2 times, line n+1 2 times, and line m zero times. Similarly, line n of class com.ourco.class2 has been executed 8 times and line n+1 6 times. Line m of the class com.ourco.class2 shows one possible optimization for usage table 400. When a count for a particular line of code exceeds a configurable threshold, the count is recorded as "infinite" of "Inf" meaning that the line of code has been counted so many times that any higher counts may provide little added precision. In some examples, use of "Inf" may support an upper limit on a number of bits used to record each count. For example, when each count is limited to 8-bits, "Inf" may be entered for any count of 255 or higher. In some examples, "Inf" may represent any number above a configurable threshold.

Although usage table 400 is depicted as a table, usage table 400 may be implemented using any suitable data structure that may be referenced based on a class name and a line number. In some examples, usage table 400 may be stored as a sparse table to use any corresponding storage space more efficiently when each class contains a different number of lines of code. In some examples, usage table 400 may be stored in a database. In some examples, the database may be indexed by class name and line number.

In some examples, usage table 400 may be based on a different organization to make it more efficient. In some examples, the usage counts may be kept for each block of code that is executed together. In some examples, a block of code that is executed together may occur when the body of a then clause, a loop and/or some other control or code structure contains no other control structures. In some examples, when usage table 400 is used with a software application written in a non-object-oriented language, the class name may be omitted and/or replaced with a file name and/or other suitable identifier.

Referring back to FIG. 3, at a process 320, a software update is analyzed to determine lines of interest. When a software application is updated, a developer will typically delete one or more lines of code, change one or more lines of code, and/or add one or more lines of code. Each update to the code, whether in the form deleted, changed, or added lines of code, alters the way the software application operates and may result in an adverse impact on one or more users of the software application. By estimating how often each update is "executed" after the software update is applied, an estimate of the impact of those updates can be determined. As an example, if during usage monitoring, a first line of code is executed 25 times and a second line of code is executed 10 times, there is a greater likelihood, complexity of the two lines of code aside, that an update (deletion or change) made to the first line of code is more likely to impact a user than an update (deletion or change) made to the second line of code because the update to the first line of code is 2.5 times more likely to be "executed" after the software update. This may also extend to added lines of code, whose usage may be estimated by examining the number of times the lines of code before and/or after the added lines are executed. In some examples, when the added lines occur in a block of code, the estimated usage of the added lines of code may be similar to the usage count for the block of code.

In some examples, to determine the lines of interest, such as the deleted, changed, and added lines, the source code of the software application prior to (e.g., the base code 150) and after (e.g., the updated code 160) the software update are compared. In some examples, a diff tool may be used to determine the deleted, changed, and added lines between the base code and the updated code. In some examples, other lines of interest may be associated with method and/or function calls. Whenever the body of a method and/or function is updated by deleting, changing, and/or adding lines of code, the function of the method and/or function may be altered. Thus, the more times an updated method and/or function is called, the more likely that update may impact the software application. In some examples, each of the lines of code that call an updated method and/or function may also be lines of interest. In some examples, other lines of interest may be associated with classes and/or data structures. Whenever non-executable code associated with a class and/or data structure is updated by deleting, changing, and/or adding lines of code, the behavior of the class and/or data structure may be altered. In some examples, the non-executable code may be associated with the declaration or definition of variables, member variables, data members, and/or the like. Thus, the more times an updated class and/or data structure is referenced, the more likely that update may impact the software application. In some examples, each of the lines of code that reference an updated class and/or data structure may also be lines of interest.

Figure 5:
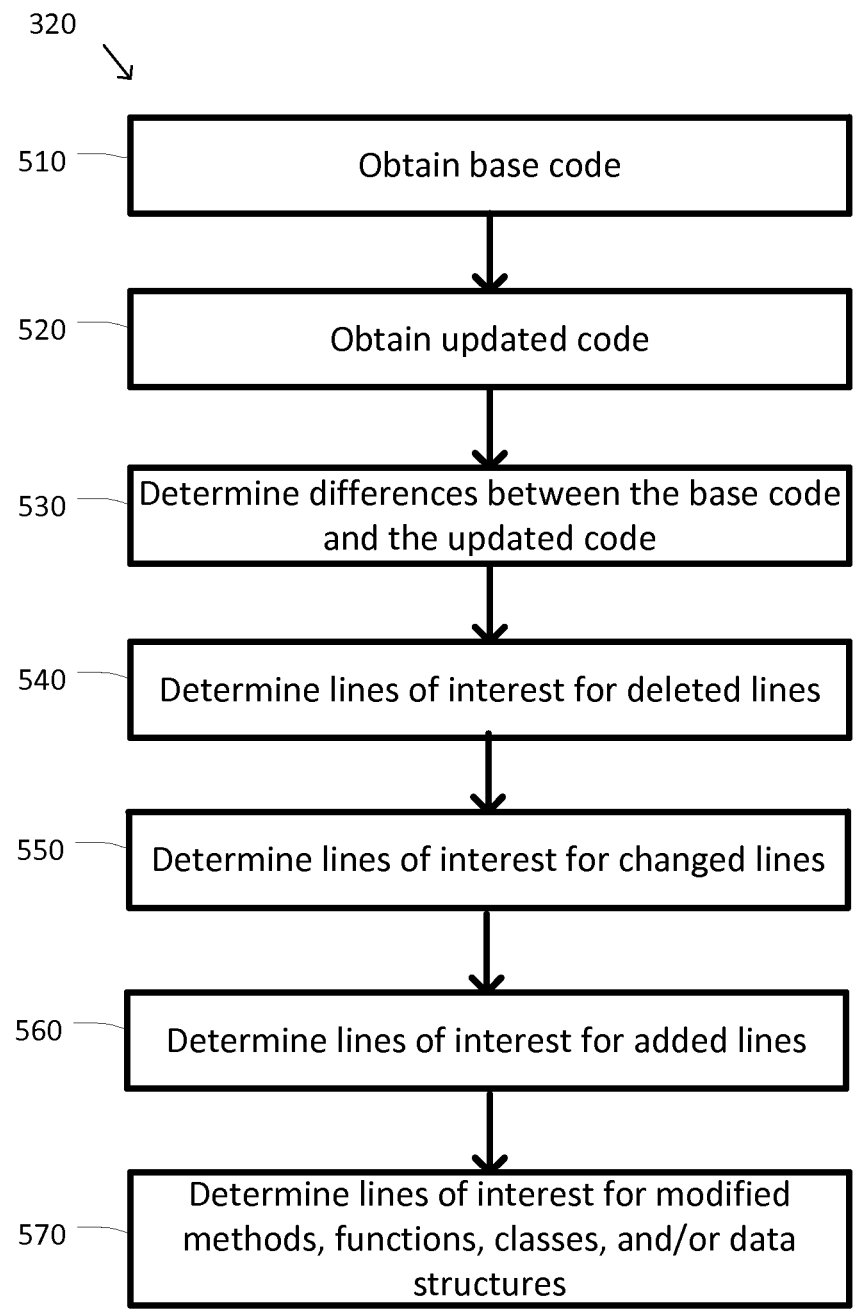
FIG. 5 is a simplified diagram of a process for analyzing a software update to determine lines of interest according to some examples.

FIG. 5 is a simplified diagram of the process 320 for analyzing a software update to determine lines of interest according to some examples. In some examples, one or more of the processes 510-570 of process 320 may be implemented, at least in part, in the form of executable code stored on non-transient, tangible, machine readable media that when run by one or more processors (e.g., the processors 251) may cause the one or more processors to perform one or more of the processes 510-570. In some examples, the process 320 may be performed using impact analyzer 140 and/or 253.

At a process 510, base code is obtained. Analysis of the software update begins by obtaining the base code for a software application. In the context of impact estimation, the base code corresponds to a version of the software application that is associated with one or more usage measures previously collected, such as the one or more usage measures collected during process 310. In some examples, the base code may be the base code 150. In some examples, the base code may be retrieved from a code repository, such as code repository 254. In some examples, the base code may be stored in a source control system such as CVS, SourceSafe, Subversion, and/or the like.

At a process 520, updated code is obtained. In the context of impact estimation, the updated code corresponds to a version of the software application that is associated with the software application after the software update is applied. In some examples, the updated code may differ from the base code by one or more deleted, changed, and/or added lines. In some examples, the updated code may be the updated code 160. In some examples, the updated code may be retrieved from a code repository, such as code repository 254. In some examples, the updated code may be stored in a source control system such as CVS, SourceSafe, Subversion, and/or the like.

At a process 530, differences between the base code and updated code are determined. In some examples, a diff tool may be used to identify any updates between the base code and the updated code. In some examples, these updates may include one or more deleted lines of code that are included in the base code and not included in the updated code. In some examples, these updates may include one or more changed lines of code that are included in the base code and are included in an altered form in the updated code. In some examples, these updates may include one or more added lines of code that are not included in the base code and are included in the updated code. In some examples, each of the deleted, changed, and added lines of code may be identified by class and line number within the class. In some examples, the base code and the updated code may be pre-filtered to remove any comments and/or excess white space before the differences are determined.

At a process 540, lines of interest for deleted lines of code are determined. Not all lines of code in the base code and the updated code may be of interest. For example, comments in the base code and/or the updated code may be ignored, even when one or more of the comments are deleted. In some examples, when any of the deleted lines of code determined during process 530 are associated with an executable line of code, the class and line number of each line of code deleted from the base code may be marked as a line of interest. In some examples, the method and/or function to which the deleted line of code belongs may be recorded for further processing. In some examples, when the deleted line of code is associated with a non-executable line of code and the deleted line of code is further associated with a class and/or data structure, the associated class and/or data structure may be recorded for further processing. In some examples, when a deleted line of code is part of a code block that is monitored as a single unit, the code block is marked as being of interest rather than the individual line.

At a process 550, lines of interest for changed lines of code are determined. In some examples, when any of the changed lines of code determined during process 530 are associated with an executable line of code, the class and line number from the base code associated with each line of code changed between the base code and the updated code may be marked as a line of interest. In some examples, the method and/or function to which the changed line of code belongs may be recorded for further processing. In some examples, when the changed line of code is associated with a non-executable line of code and the changed line of code is further associated with a class or data structure, the associated class or data structure may be recorded for further processing. In some examples, when a changed line of code is part of a code block that is monitored as a single unit, the code block is marked as being of interest rather than the individual line.

At a process 560, lines of interest for added lines of code are determined. In some examples, when any of the added lines of code determined during process 530 are associated with an executable line of code, a line of code before and/or after the location where the added lines of code are added to the base code are marked as a line of interest. In some examples, a choice between the line before or the line after may be made by using any suitable method such as always choosing the line before, always choosing the line after, alternating between choosing the line before and the line after, randomly choosing between the line before and the line after, choosing both the line before and the line after with a reduced weighting (e.g., one half to average between the line before and the line after), and/or the like. In some examples, when the added lines of code are part of a code block that is monitored as a single unit, the code block is marked as being of interest rather than the line before or the line after. In some examples, when multiple lines of code are added at the same location, the chosen line of code may be weighted based on the number of added lines of code. In some examples, the chosen line of code and/or any weights are marked as a line of interest by recording the class and line number. In some examples, the method and/or function to which an added line of code belongs may also be recorded for further processing. In some examples, when the added line of code is associated with a non-executable line of code and the added line of code is further associated with a class and/or data structure, the associated class and/or data structure may be recorded for further processing.

At an optional process 570, lines of interest for updated methods, functions, classes, and/or data structures are determined. In some examples, when an executable line of code is associated with an updated method and/or function and the updated method and/or function is recorded for further processing during processes 540-560, classes and lines of code in the base code that include a call to the updated method and/or function may be marked as a line of interest. In some examples, the calls to the updated method and/or function may be determined by parsing the base code. In some examples, when a non-executable line of code is associated with an updated class and/or data structure and the updated class and/or data structure is recorded for further processing during processes 540-560, classes and lines of code in the base code that include a reference to the updated class and/or data structure may be marked as a line of interest. In some examples, the references to the updated class and/or data structure may be determined by parsing the base code. In some examples, when the line of is part of a code block that is monitored as a single unit, the code block is marked as being of interest rather than the individual line.

Referring back to FIG. 3, at a process 330, an impact factor is computed. Using the one or more usage measures collected during process 310 and the one or more lines of interest identified during process 320, the impact factor is computed. In some examples, the impact factor may be impact factor 170. In some examples, the impact factor may be computed by aggregating the usage measures from each of the usage tables for each of the lines of interest from the base code. In some examples, the usage measures may be aggregated by computing a total of the counts for each of the lines of interest in each of the usage tables. In some examples, when "Inf" is used in one or more of the usage tables, adding any number, including another "Inf," to "Inf" results in a total of "Inf." In some examples, when "Inf" is used in one or more of the usage tables, a largest possible count, such as 255 for an 8-bit count may be substituted for "Inf." In some examples, when the lines of interest are associated with weights, the total may be a weighted total. In some examples, the impact factor may further be modified using one or more normalizations. In some examples, the contribution to the impact factor from one of the usage tables may be normalized to account for a length of time the corresponding instance of the software application was monitored. In some examples, the contribution to the impact factor from one of the usage tables may be normalized to include an importance of the instance relative to other instances. In some examples, the impact factor may be further normalized to account for a total number of lines of code in the base code and/or the updated code. In some examples, the impact factor may also be normalized to account for a number of usage tables used to compute the impact factor.

Figure 6:
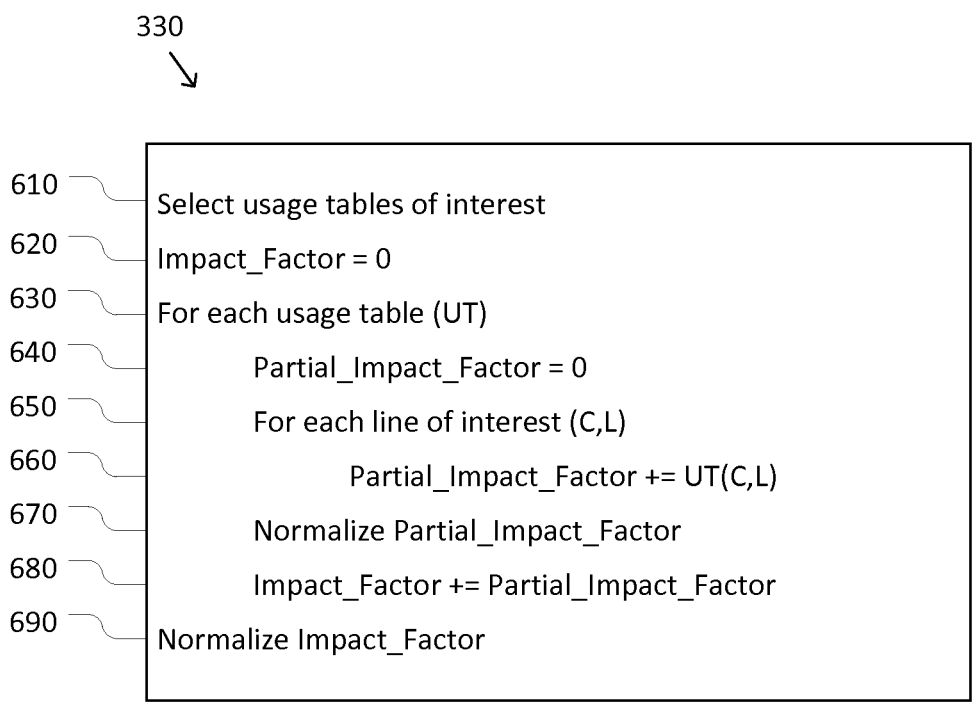
FIG. 6 is a simplified diagram of a process for computing an impact factor according to some examples.

FIG. 6 is a simplified diagram of the process 330 for computing an impact factor according to some examples. In some examples, one or more of the processes 610-690 of process 330 may be implemented, at least in part, in the form of executable code stored on non-transient, tangible, machine readable media that when run by one or more processors (e.g., the processors 251) may cause the one or more processors to perform one or more of the processes 610-690. In some examples, the process 330 may be performed using impact analyzer 140 and/or 253.

At a process 610, one or more usage tables of interest are selected. Depending on the number of usage table collected during process 310, one or more usage tables are selected. In some examples, the selected usage tables may be chosen to include usage tables for instances of the software application that correspond to a particular end user and/or customer. In some examples, the selected usage tables may correspond to instances of the software application that are subjected to one or more usage patterns.

At a process 620, the impact factor is initialized to zero.

At a process 630, each of the usage tables (UT) selected during process 610 are iterated through one at a time. A partial impact factor may be computed for each of the usage tables so that the contribution of each usage table to the impact factor may be normalized separately.

At a process 640, the partial impact factor is initialized to zero. With each usage table being processed, the partial impact factor is reinitialized to zero.

At a process 650, each of the lines of interest determined during processes 320 and 540-570 are iterated through one at a time. In some examples, the current line of interest may be identified by a class name (C) and a line number (L).

At a process 660, the partial impact factor is increased by the usage count associated with the class name and line number in the current usage table. In some examples, the class name and the line number may be used as indexes into the usage table to access the usage count for the corresponding class name and line number in the usage table. In some examples, when "Inf" is used in the current usage table, adding any number, including another "Inf," to "Inf" results in a total of "Inf." In some examples, when "Inf" is used in the current usage table, a largest possible count, such as 255 for an 8-bit count, and/or the configurable maximum count may be substituted for "Inf." In some examples, when the current line of interest is also associated with a weight, the usage count is adjusted by the weight before the usage count is used to increase the partial impact factor.

At an optional process 670, the partial impact factor may be normalized. In some examples, the partial impact factor may be normalized in order to address differences in how the usage counts in the current usage table were collected relative to other usage tables selected during process 610. In some examples, the partial impact factor may be normalized based on the length of time the instance of the software application corresponding to the current usage table was monitored to collect the usage counts in the current usage table. In some examples, the normalization may be relative to other usage tables selected during process 610 and/or to an absolute time standard, such as usage counts per hour.

At process 680, the impact factor is increased by the partial impact factor. Once the usage counts from the current usage table for each of the lines of interest are included in the partial impact factor, the partial impact factor may be added to the impact factor. In some examples, when either the partial impact factor or the impact factor is equal to "Inf," the impact factor becomes "Inf." In some examples, when multiple usage tables are used to compute the impact factor, the impact factor may be a composite impact factor.

At an optional process 690, the impact factor may be normalized. In some examples, the impact factor may be normalized to provide greater comparability between impact factors for different software updates. In some examples, a normalized impact factor may support relative comparisons between different software updates to see which software update is more likely to impact end users and/or customers. In some examples, a normalized impact factor may support an absolute scale for impact factors that may support decisions on how much testing should be performed on a software update before releasing the update and/or whether the software update is recommended for some end users and/or customers, and not others. In some examples, the impact factor may be normalized based on a number of lines of code in the base code and/or a number of usage tables selected during process 610. In some examples, when the normalization of process 670 is combined with the normalization of process 690, the normalized impact factor may be computed to an absolute scale, such as usage counts per hour and per 1000 lines of code.

Some examples of deployment environments 210, 220, and/or 230 and/or workstations 240 and/or 250 may include non-transient, tangible, machine readable media that include executable code that when run by one or more processors (e.g., processor 211, 221, 231, 241, and/or 251) may cause the one or more processors to perform the processes of method 300 as described above. Some common forms of machine readable media that may include the processes of methods 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, FIGS. 1-6 are merely examples which should not unduly limit the scope of the claims. One of ordinary skill in the art would recognize many variations, alternatives, and modifications. In some examples, programming languages other than Java may be used. In some examples, JVMs 213, 223, 225, and/or 233 may be some other type of virtual machine and/or omitted.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the inven-

What is claimed is:

1. A method of estimating an impact of a software update, the method comprising:
obtaining first usage measures for each executable line of source code of a first instance of a software application;
analyzing the software update of the software application by comparing base source code for the software application to updated source code for the software application to determine differences between the base source code and the updated source code;
identifying one or more executable source code lines of interest from the base source code based on the differences, the identified one or more executable source code lines of interest including:
first executable lines of source code deleted from the base source code;
second executable lines of source code in the base source code changed between the base source code and the updated source code;
third executable lines of source code in the base source code located immediately before or after each executable line of source code added to the updated source code; and
fourth executable lines of source code in the base source code that include a reference to a class or data structure containing one or more deleted, changed, or added lines of source code in the updated source code even when the fourth executable lines of source code are not changed;
aggregating the first usage measures for each of the source code lines of interest by adding together counts included in the first usage measures for each source code line of interest; and
estimating an impact of the software update based on the aggregated first usage measures;
wherein the updated source code corresponds to source code for the software application after the software update is applied to the base source code.

2. The method of claim 1, further comprising retrieving the base source code and the updated source code from one or more code repositories.

3. The method of claim 1 wherein the first usage measures include counts of a number of times each executable line of source code in the base source code is executed.

4. The method of claim 3 wherein any of the counts larger than a threshold are replaced by an infinite designation.

5. The method of claim 1 wherein the first usage measures are stored in a usage table organized by classes and line numbers within the classes.

6. The method of claim 1 wherein the first usage measures are stored in a usage table organized by code block.

7. The method of claim 1 wherein the counts are weighted.

8. The method of claim 1 wherein the identified one or more executable source code lines of interest further include fifth executable lines of source code in the base source code that include a call to a method or function containing one or more deleted, changed, or added executable lines of source code in the updated source code even when the fifth executable lines of source code are not changed.

9. The method of claim 1, further comprising normalizing the estimate of the impact of the software update.

10. The method of claim 9, wherein normalizing the estimate of the impact of the software update comprises normalizing based on one or more normalization factors selected from a group consisting of a length of time used to collect the first usage measures for the first instance, a number of lines of source code in the base source code, and a number of lines of source code in the updated source code.

11. The method of claim 1, further comprising:
obtaining second usage measures for each executable line of source code for a second instance of the software application; and
aggregating the aggregated first usage measures with the second usage measures for the source code lines of interest to determine a composite estimate of the impact of the software update.

12. A system for estimating an impact of a software update, the system comprising:
one or more processors;
memory coupled to the one or more processors;
a first usage monitor that monitors execution of a first instance of a software application to determine first usage measures for each executable line of source code of the first instance;
base source code for the software application corresponding to source code for the first instance, the base source code being stored in the memory;
updated source code for the software application corresponding to source code for the software application after the software update is applied to the base source code, the updated source code being stored in the memory; and
an impact analyzer that:
compares the base source code to the updated source code to determine differences between the base source code and the updated source code;
identifies one or more executable source code lines of interest from the base source code based on the differences, the identified one or more executable source code lines of interest including:
first executable lines of source code deleted from the base source code;
second executable lines of source code in the base source code changed between the base source code and the updated source code;
third executable lines of source code in the base source code located immediately before or after each executable line of source code added to the updated source code; and
fourth executable lines of source code in the base source code that include a reference to a class or data structure containing one or more deleted, changed, or added lines of source code in the updated source code even when the fourth executable lines of source code are not changed;
aggregates the first usage measures for each of the source code lines of interest by adding together counts included in the first usage measures for each source code line of interest; and
estimates an impact of the software update based on the aggregated first usage measures.

13. The system of claim 12 wherein the first usage monitor monitors debugging information provided by a Java virtual machine executing the first instance.

14. The system of claim 12 wherein the first usage monitor is an extension to a Java virtual machine executing the first instance.

15. The system of claim 12, further comprising:
a second usage monitor that monitors execution of a second instance of the software application to determine second usage measures for lines of source code of the second instance;
wherein the impact analyzer further aggregates the first usage measures with the second usage measures for the executable source code lines of interest to determine a composite estimate of the impact of the software update.

16. A non-transitory machine-readable medium comprising a first plurality of machine-readable instructions which when executed by one or more processors associated with one or more computing systems are adapted to cause the one or more processors to perform a method comprising:
retrieving first usage counts for each executable line of source code of a program running in a first deployment environment;
retrieving second usage counts for the each executable line of source code of the program running in a second deployment environment;
determining one or more differences between source code for the program and updated source code for the program after a code update is applied, the differences including:
first executable lines of source code deleted from the source coded;
second executable lines of source code in the source code changed between the source code and the updated source code;
third executable lines of source code in the source code located immediately before or after each executable line of source code added to the updated source code; and
fourth executable lines of source code in the source code that include a reference to a class or data structure containing one or more deleted, changed, or added lines of source code in the updated source code even when the fourth executable lines of source code are not changed; and
adding the first usage counts for each of the executable lines of source code in the differences and the second usage counts for each of the executable lines of source code in the differences to compute an impact factor.

17. The non-transitory machine-readable medium of claim 16, further comprising a second plurality of machine-readable instructions which when executed by the one or more processors are adapted to cause the one or more processors to perform a method comprising normalizing the impact factor using one or more normalization factors selected from a group consisting of a length of time used to collect the first usage counts, a length of time used to collect the second usage counts, a number of lines of source code in the program, and a number of lines of source code in the program after the code update is applied.

* * * * *